US007584030B1

(12) United States Patent
Graham

(10) Patent No.: US 7,584,030 B1
(45) Date of Patent: Sep. 1, 2009

(54) WIRELESS AUTOMOTIVE DATA LINK CONNECTOR

(76) Inventor: Neil John Graham, 6017 Lido La., Long Beach, CA (US) 90803

( * ) Notice: Subject to any disclaimer, the term of this patent is extended or adjusted under 35 U.S.C. 154(b) by 0 days.

(21) Appl. No.: 12/151,608

(22) Filed: May 9, 2008

(51) Int. Cl.
*G01M 17/00* (2006.01)

(52) U.S. Cl. ........................................................ 701/29

(58) Field of Classification Search .................... 701/29
See application file for complete search history.

(56) References Cited

U.S. PATENT DOCUMENTS 6,732,031 B1 * 5/2004 Lightner et al. ............... 701/33
2005/0138373 A1 * 6/2005 Clark et al. ................. 713/166
2006/0149437 A1 * 7/2006 Somos ........................ 701/29
2007/0083303 A1 * 4/2007 O'Sullivan et al. ............ 701/29
2007/0259637 A1 * 11/2007 Basir et al. ............... 455/238.1

* cited by examiner

*Primary Examiner*—Mark Hellner
*Assistant Examiner*—Helal A Algahaim
(74) *Attorney, Agent, or Firm*—Neil John Graham

(57) ABSTRACT

This invention relates generally to releasable connectors with a wireless connection between automotive test equipment and an automobile On-Board Diagnostic computer wherein the data link connection (DLC) cable is replaced, using two connectors which have been pre-programmed to communicate with each other.

19 Claims, 3 Drawing Sheets

Fig. 3
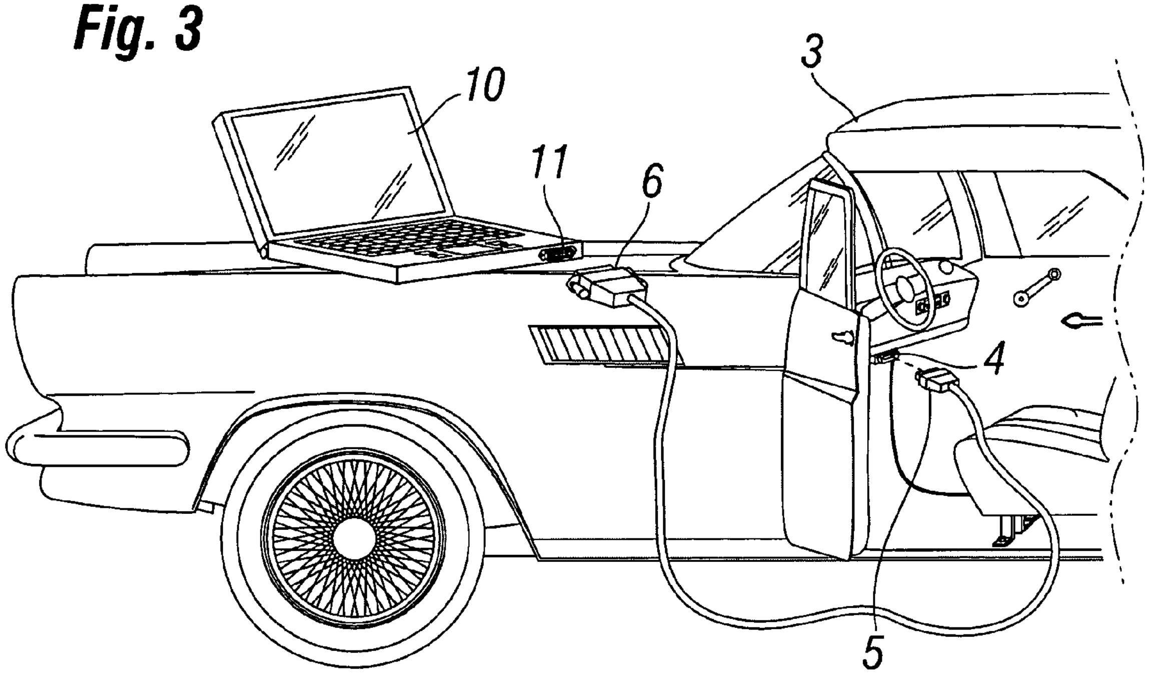
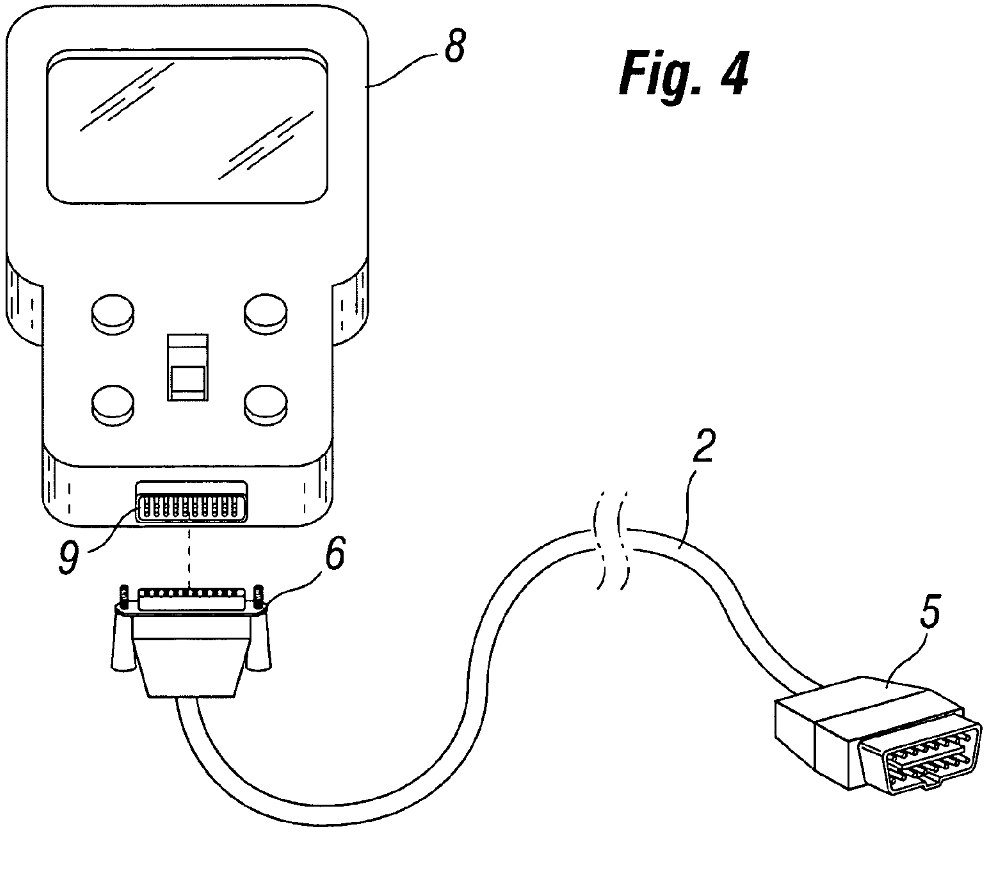
Fig. 4

WIRELESS AUTOMOTIVE DATA LINK CONNECTOR

FIELD OF THE INVENTION

This invention relates generally to equipment for monitoring an automobile On-Board Diagnostic computer, and more particularly to a wireless connection, wherein the data link connection (DLC) cable is replaced, using two connectors which have been pre-programmed to communicate with each other.

BACKGROUND

An On-Board Diagnostic, or OBD, system is a computer-based system for diagnosing operational errors. An On-Board Diagnostic, or OBD, system is a computer-based system that was developed by automobile manufacturers to monitor the performance of various components on an automobile's engine, including emission controls. Modern vehicles typically have a vehicle diagnostic system, including one or more separate computer control modules. Examples of such computer control modules (also known as just "modules") are: a power train control module (PCM), an engine control module (ECM), a transmission control module (TCM), an ABS control module, and an air bag control module. Upon detection of any malfunction, the OBD system provides the owner of the automobile with an early warning (in other words, check engine light in the dashboard of automobile). OBD was primarily introduced to meet EPA emission standards but, through the years, onboard diagnostic systems have become more sophisticated. For example, OBD II, Standard Edition in the mid-90s implemented in light-duty cars and trucks, provides a plurality of sensors to monitor malfunctions with engine, chassis, body, and accessory devices. In a simple scenario, the OBD system detects a malfunction in the engine (or any other component that is monitored by sensors of the OBD system) and signals a warning indicative of such a function. For example, a "check engine" light could be illuminated in an automobile's dashboard indicative of such a malfunction. The automobile's owner, upon noticing such a warning indicator, makes plans for taking the automobile to a repair shop where the malfunction can further be investigated. Upon arrival at the repair shop personnel connect a data link cable that serves as a communications link between the automobile's diagnostic port and an "off-board" device. Off-board devices," such as scan tools and code readers, are known in the art. Scan tool and code reader testing devices that interface with vehicle diagnostic systems access, display, and/or print vehicle diagnostic information. OBD II (On-Board Diagnostics version II) Scan Tools are one commonly known type of scan tool and are governed by a number of standards, e.g., SAE J1978 Rev. 1998-02 and SAE J1979 Rev. 1997-09. Scan tools are relatively expensive diagnostic devices that have a relatively large number of features and are typically marketed to professional automobile mechanics and service stations. There are different types of scan tools. An "OBD II Scan 45 Tool" complies with the above-identified specifications. By contrast, a "Manufacturer-Specific Scan Tool" is a scan tool that accesses and displays proprietary manufacturer-specific data (and possibly also additionally accesses and displays OBD II data. A code reader is another example of an "off-board" device.

The "off-board" device may be a somewhat stationary scan tool test station, laptop or mobile code reader/scan tool, all connected to a data link cable. An example of a semi-stationary scan tool test station is found in a smog test station where a long data link cable can be seen stretching from the "off-board" device to the automobile.

SUMMARY OF THE INVENTION

It is the object of this invention to provide a system and method in the form of a pair of preprogrammed releasable wireless connections replacing an automotive data link cable (DLC) for communicating information between a motor vehicle data bus and an automotive code reader/scanner. The wireless DLC has a first connector which fits to the motor vehicle data bus and a second connector which fits with the automobile code/reader scanner. The first connector has readout conductors, a processor and memory that connect to a vehicle data bus connector, the vehicle data bus connector having a plurality of readout conductors which communicate with corresponding readout conductors in the first connector unit. A program in the first connector links wireless information with the appropriate readout conductors. The second connector has readout conductors, a processor and memory that connect to an automotive code reader/scanner connector having a plurality of readout conductors which communicate with corresponding readout conductors in the second connector unit. A program in the second connector links wireless information with the appropriate readout conductors. The first and second connectors each have wireless circuitry and programming wherein they connect automatically with each other once they receive power. The first connector receives its power from the automobile and the second connector receives its power from the test equipment it is attached to. In an alternative, the first and second connectors may be battery operated. A further option would be rechargeable batteries.

In a preferred embodiment, the first and second connectors are code matched pairs which are pre-programmed to mutually wirelessly communicate with each other. This embodiment extends to multiple pairs of first and second connectors, with each pair having different matching wireless frequencies.

In another embodiment the first and second connectors have a touch screen wherein multiple connection frequencies may be selected. This is advantageous where there is a single test unit and multiple vehicles. Each vehicle can have a different coded first connector unit and the test unit second connector can be recoded to communicate with each vehicle's connector. An example would be code numbers 1-10, wherein code number 1 on the test unit connector connects with code number 1 on the automobile connector and changing the test unit connector to code number 6 allows the test unit to connect with a nearby automobile with a vehicle connector with code number 6.

The wireless connection may be Blue Tooth, Ethernet, RF, WLAN, wireless USB or other forms of wireless transmission.

BRIEF DESCRIPTION OF THE DRAWINGS

FIG. 3 is a perspective view of a computer connected to an automobile;

FIG. 4 is a perspective view of a of an OBD2 handheld test unit connected to an automobile bus connector;

DETAILED DESCRIPTION

Figure 1:
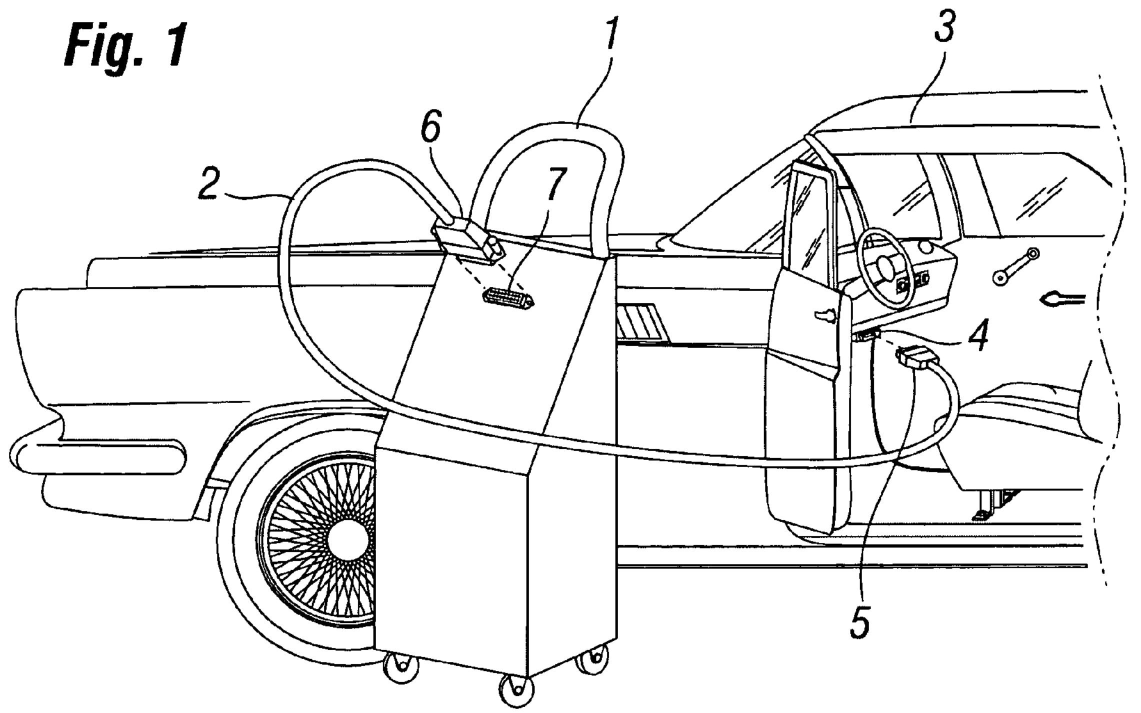
FIG. 1 is a perspective view of an automotive test unit connected by DLC cable to an automobile.
Figure 2:
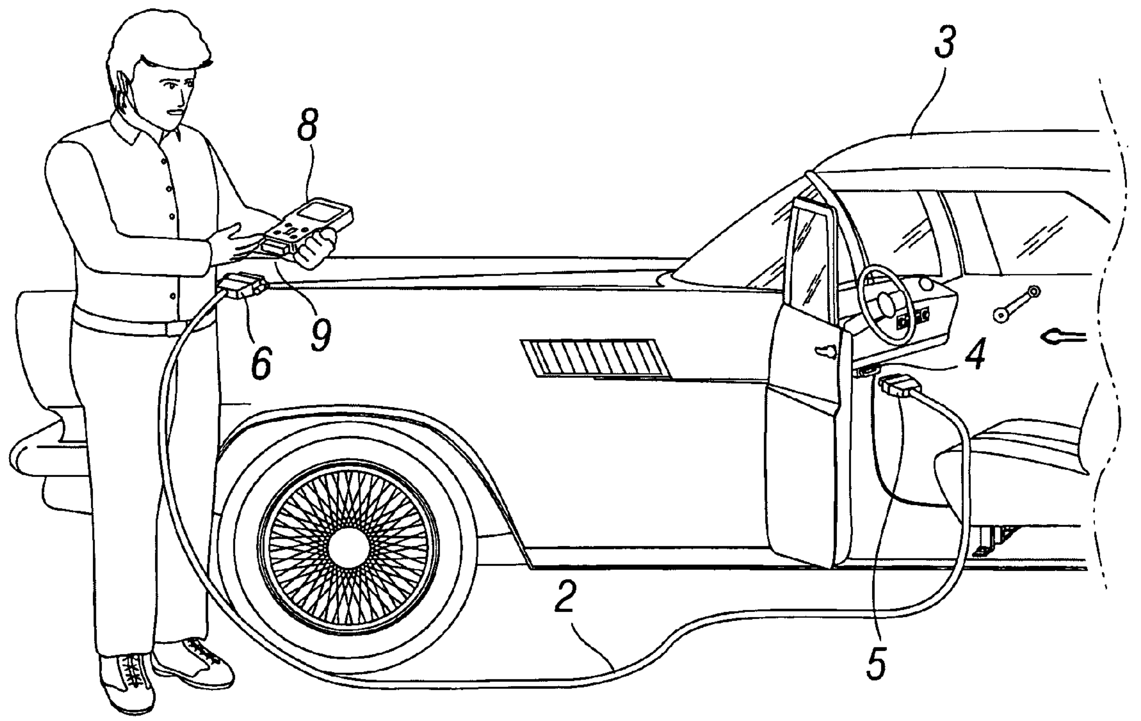
FIG. 2 is a perspective view of a hand held OBD2 automotive test unit connected by DLC cable to an automobile.
Figure 5:
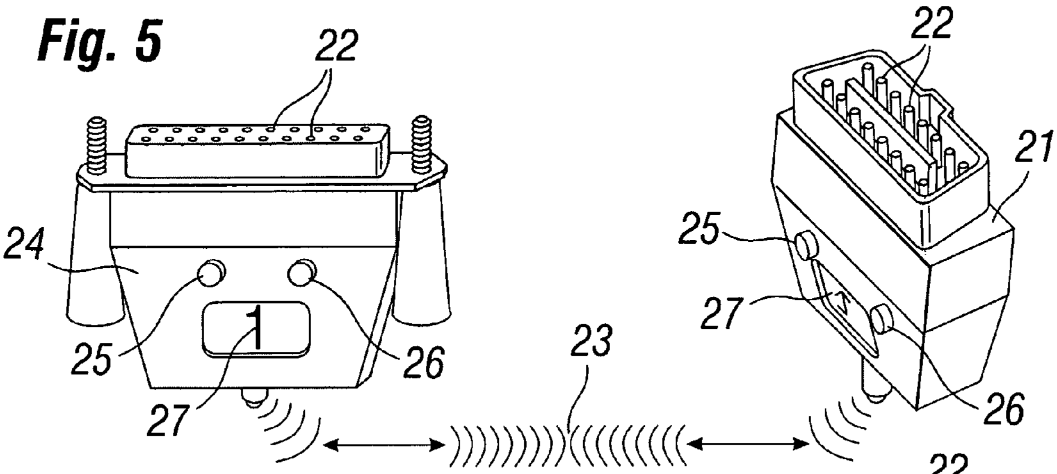
FIG. 5 is a perspective view of a second connector unit wirelessly connected to a first connector unit.

The present invention relates to a wireless connection replacing an automotive data link connector (DLC) which connects an on-board automotive computer to devices such as found in automobile smog test centers and repair shops, computers and handheld OBD units. FIGS. 1-4 reveal the prior art of the data link connector cable (DLC). FIG. 1 discloses an emissions test unit 1 as found in an emissions test facility. The DLC cable 2 connects the emissions test unit 1 to the vehicle data bus 4. The DLC cable 2 has a multiple pin removable vehicular connector 5 which attaches to the vehicle data bus 4. The opposite end of the DLC cable 2 has a multiple pin removable tester connector 6 attaching to a multiple pin connector 7 of the test unit, commonly 16 pins. In FIG. 2 the DLC cable 2 is connected to an OBD II code reader/scanner 8 25 pin connector 9. In FIG. 3, the DLC cable 2 is connected to a computer 10 pin connector 11. FIG. 5 discloses a close-up view of the DLC cable 2 with an OBD II code reader/scanner 8 as disclosed in FIG. 2.

FIG. 5 discloses a preferred embodiment of the wireless automotive data link connectors 21, 24. The first connector unit 21 has readout conductors 22 which mate with readout conductors of the vehicle data bus 4 as shown in FIGS. 1-3. A processor and memory are programmed in the first connector unit 21 to link wireless information 23 with the appropriate readout conductors 22. The processor is programmed with a wireless connection 23 pre-programmed to directly connect to the second connector unit 24. A red light 25 indicates power is being received from the automobile data bus 4 and a green light 26 indicates a wireless connection 23 between the first connector unit 21 and the second connector unit 24. A number 27 on each connector 21, 24 matches indicating the connectors 21, 24 only have a wireless connection with each other. The second connector unit 24 with readout conductors 22 that mate to an automotive code reader/scanner 8, as in FIG. 4 with a plurality of readout conductors 9 which communicate with corresponding readout conductors in the second connector unit 24.

A processor and memory are programmed in the second connector unit 24 to link wireless information with the appropriate readout conductors 22. The processor is programmed with a wireless connection 23 pre-programmed to directly connect to the first connector unit 21. A red light 25 indicates power is being received from the automobile data bus 4 and a green light 26 indicates a wireless connection 23 with the first connector unit 24. A number 27 on each connector 21, 24 matches indicating the connectors 21, 24 only have a wireless connection with each other. In FIG. 5 each connector unit has the number one 27.

Figure 6:
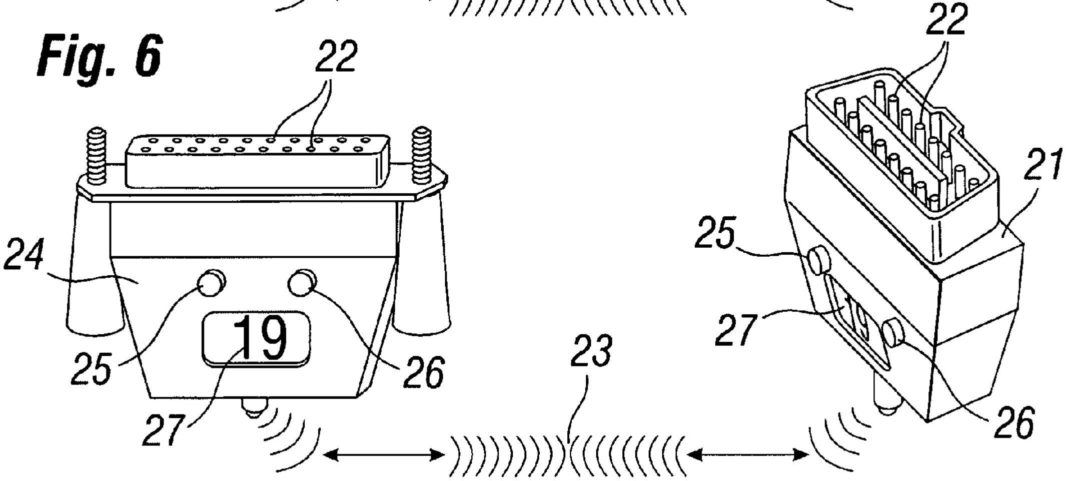
FIG. 6 is a perspective view of a second connector unit wirelessly connected to a first connector unit wherein the unit communication code numbers are changeable.
Figure 7:
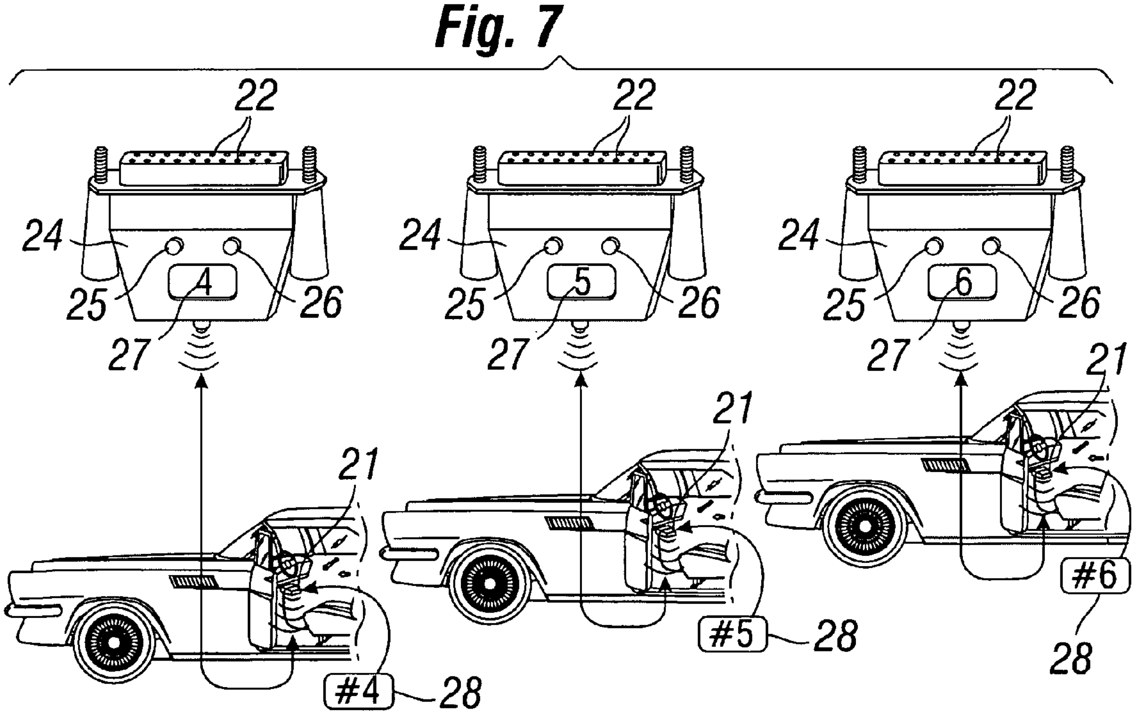
FIG. 7 is a perspective view of second connector units with different codes connecting with correspondingly coded units on different automobiles.

FIG. 6 shows the number nineteen on each connector unit 21, 24. The connector units 21, 24 are in a plurality of matched pairs, requiring no programming. The connector units 21, 24 are removably plugged into their respective fittings. FIG. 7 discloses a preferred embodiment wherein the second connector unit 24 has a LCD touch screen 27 wherein different numbers can be selected to match different numbered 28 first connector units 21. The programmable second connector unit 24 can be programmed to communicate with the first connector unit 21 on the vehicle and reprogrammed to connect wirelessly with a second connector unit 24 on a computer 10. An OBD II first unit 21 may have a variety of adapters. The adapters are for OBD prior to 1996. Examples of adapters are: GM 82-95, Ford 83-95, Chrysler/Jeep 84-95 and Toyota/Lexus 89-95. This list is not intended to limit all the types of adapters.

The present invention has been described in specific embodiments; but there is no intention to limit the invention to these variations. The spirit of the invention is the invention provides a wireless automotive DLC which simply snaps into place and functions without programming other than selecting the unit numbers in one of the variations

What is claimed:

1. A wireless automotive data link connector for communicating information between a motor vehicle data bus and an automotive code reader/scanner comprising:

a first OBD2 connector housing readout conductors, a processor and memory that mates releasably to the vehicle data bus connector, the vehicle data bus connector with a plurality of readout conductors which communicate with corresponding readout conductors in the first connector unit;

a program in the first connector unit which links wireless information with the appropriate readout conductors:

a second connector unit housing readout conductors, a processor and memory that mates releasably to the automotive code reader/scanner with a plurality of readout conductors which communicate with corresponding readout conductors in the second connector unit;

a program in the second connector unit which links wireless information with the appropriate readout conductor; and wireless connections in the first and second connector units programmed to directly connected between the first connector unit and the second connector unit.

2. The wireless automotive data link connector in claim 1 wherein the second connector unit is a multiple pin connector, a 16 pin found in smog check stations or 25 pin as found in OBD2 code reader/scan tools.

3. The wireless automotive data link connector in claim 1 wherein the connector units are externally powered, the first connector unit is powered by the vehicle and the second connector unit is powered by the OBD2 code reader/scanner.

4. The wireless automotive data link connector in claim 1 wherein the connector units each have an indicator light indicating a power connection.

5. The wireless automotive data link connector in claim 1 wherein the connector units each have an indicator light indicating a wireless connection between the connector units.

6. The wireless automotive data link connector in claim 1 wherein the wireless communication link comprises a wireless Ethernet network link.

7. The wireless automotive data link connector in claim 1 wherein the wireless communication link comprises an RF transmitter and receiver.

8. The wireless automotive data link connector in claim 1 wherein the wireless communication link comprises a Bluetooth connection.

9. A wireless automotive data link connector as in claim 1 wherein the first and second connectors have internal rechargeable batteries.

10. A wireless automotive data link connector for communicating information between a motor vehicle data bus and an automotive code reader/scanner comprising:

a first an OBD2 connector housing readout conductors, a processor and memory that mates releasably to the vehicle data bus connector, the vehicle data bus connector with a plurality of readout conductors which communicate with corresponding readout conductors in the first connector unit;

a program in the first connector unit which links wireless information with the appropriate readout conductors;

a second connector unit housing readout conductors, processor and memory that mates to an automotive code reader/scanner with a plurality of readout conductors which communicate with corresponding readout conductors in the second connector unit;

a program in the second connector unit which links wireless information with the appropriate readout conductor; and a multiple wireless connection program in the first and second connector units wherein a selected program in the first connector unit connects to second connector unit with the same selected program.

11. The wireless automotive data link connector in claim 10 wherein the second connector unit is a multiple pin connector, a 16 pin or 25 pin as found in OBD2 code reader/scan tools.

12. The wireless automotive data link connector in claim 10 wherein the connector units are externally powered, the first connector unit is powered by the vehicle and the second connector unit is powered by the OBD2 code reader/scanner.

13. The wireless automotive data link connector in claim 10 wherein the connector units each have an indicator light indicating a power connection.

14. The wireless automotive data link connector in claim 10 wherein the connector units each have an indicator light indicating a wireless connection between the connector units.

15. The wireless automotive data link connector in claim 10 wherein the wireless communication link comprises a wireless Ethernet network link.

16. The wireless automotive data link connector in claim 10 wherein the wireless communication link comprises an RF transmitter and receiver.

17. The wireless automotive data link connector in claim 10 wherein the wireless communication link comprises a Bluetooth connection.

18. The wireless automotive data link connector in claim 10 wherein the first and second connector units have a display screen with a method for choosing a program.

19. A wireless automotive data link connector as in claim 10 wherein the first and second connectors have internal rechargeable batteries.

* * * * *